United States Patent [19]

Holland et al.

[11] 3,845,420

[45] Oct. 29, 1974

[54] SURFACE ACOUSTIC WAVE PHASE CONTROL DEVICE

[75] Inventors: Melvin G. Holland, Lexington; Manfred B. Schulz, Sudbury; Harrison H. Barrett, Lexington, all of Mass.

[73] Assignee: Raytheon Company, Lexington, Mass.

[22] Filed: Mar. 2, 1973

[21] Appl. No.: 337,346

[52] U.S. Cl. .................... 333/30 R, 310/9.8, 333/72

[51] Int. Cl. ........ H03h 9/26, H03h 9/30, H03h 9/32

[58] Field of Search ............. 333/30 R, 72; 310/9.7, 310/9.8

[56] References Cited

UNITED STATES PATENTS

| | | | |
|---|---|---|---|
| 3,663,899 | 5/1972 | Dieulesaint et al. | 333/70 T |
| 3,675,163 | 7/1972 | Hartmann et al. | 333/30 R |
| 3,697,899 | 10/1972 | Dias | 333/30 R |
| 3,710,465 | 1/1973 | Thomann | 333/30 R |
| 3,723,915 | 3/1973 | Adler et al. | 333/30 R |

OTHER PUBLICATIONS

Campbell et al. – "A Method for Estimating Optimal Crystal Cuts and Propagation Directions for Excitation of Piezoelectric Surface Waves" in IEEE Transactions on Sonics and Ultrasonics, Vol. SU-15, No. 4, Oct. 1968; pages 209-217.

Smith et al. – "Dispersive Rayleigh Wave Delay Line Utilizing Gold on Lithium Niobate" IEEE Trans. MTT 17, Nov. 1969; pp. 1043-1044.

Auld et al. – "Control of Acoustic Surface Waves with Photoconductive Cds Film" in Applied Physics Letters, Vol. 18, No. 8, Apr. 15, 1971; pp. 339-341.

*Primary Examiner*—James W. Lawrence
*Assistant Examiner*—Marvin Nussbaum
*Attorney, Agent, or Firm*—Joseph D. Pannone; Milton D. Bartlett; Herbert W. Arnold

[57] ABSTRACT

A surface acoustic wave device in which a phase or velocity shifting electrically conductive layer is located between the receiving and transmitting transducers. In one embodiment as a filter, the phase shift may be varied as a function of frequency over a broad range of frequencies by varying the shape of the conductive layer thereby permitting a desired phase response to be achieved.

18 Claims, 5 Drawing Figures

SURFACE ACOUSTIC WAVE PHASE CONTROL DEVICE

BACKGROUND OF THE INVENTION

Acoustic wave devices have previously been used to construct delay lines and filters. Often, in such devices, it is desired to precisely control the delay through the device in order to insure proper phase characteristics. Also, it is sometimes desired to alter slightly the delay or phase characteristics of an available device without having to manufacture a completely new device. Previously, it was necessary to position the transmitting and receiving taps on the device with the same precision desired for the phase characteristics because moving a tap by one wavelength's distance on the surface of the acoustic wave device changes the delay by one cycle or 360°. For example, in $LiNbO_3$, one of the most commonly used materials for acoustic wave devices, one wavelength at a frequency of 200 MHz is equal to $1.75 \times 10^{-3}$ cm. Small positioning accuracies for fractions of that wavelength are difficult to achieve. If the phase were in error, or devices with similar but slightly different time delay were needed, a new mask had to be made for every device. Furthermore, even if such accuracy were to be achieved, it is often desired to alter the delay time slightly without having to make a new photolithographic mask each time a slight change is desired. In the prior art, no methods for doing this are evident.

SUMMARY OF THE INVENTION

Problems of the prior art concerning adjustment of phase response and time delay for a piezoelectric surface wave device may be overcome with the combination of means for propagating a surface wave in a piezoelectric material and means for varying the velocity of the surface wave over at least a portion of the piezoelectric material. This propagating means includes a slice or wafer of piezoelectric material cut to appropriate dimensions with means for inducing the surface wave in the slice of peizoelectric material. The means for inducing the surface wave may be any type of transducer capable of transforming an input electrical signal into a mechanical signal in the piezoelectric material. One preferred type of piezoelectric material is $LiNbO_3$. The means for varying the velocity of the surface wave includes a sheet of conductive material such as aluminum adjacent to the surface of the piezoelectric material. In some embodiments, the conductive material is a layer of photoconductive material which conducts when light is shone upon it. Furthermore, means may be provided for producing an electrical signal in response to the surface wave thereby providing an output from the device. Such a device may be used in a radar system or in various types of receiving circuits such as a filter in a color television receiver.

Furthermore, objections of the prior art may be overcome by providing the combination of a slice of piezoelectric material having at least one substantially smooth surface, a first transducer adjacent to the smooth surface for converting an electrical signal into a surface wave on and within the smooth surface, a second transducer for producing an electrical signal in response to the surface wave, and a sheet or layer of conductive material adjacent to the substantially smooth surface located between the two transducers. The two transducers in a preferred embodiment are interleaved pairs or sets of conductive strips or fingers. The conductive sheet is preferably aluminum with a thickness of between 100 A and 300 A.

BRIEF DESCRIPTION OF THE DRAWINGS

The objects and other features of the invention are explained in the following description taken in connection with the accompanying drawings wherein.

DESCRIPTION OF THE PREFERRED EMBODIMENTS

Figure 1:
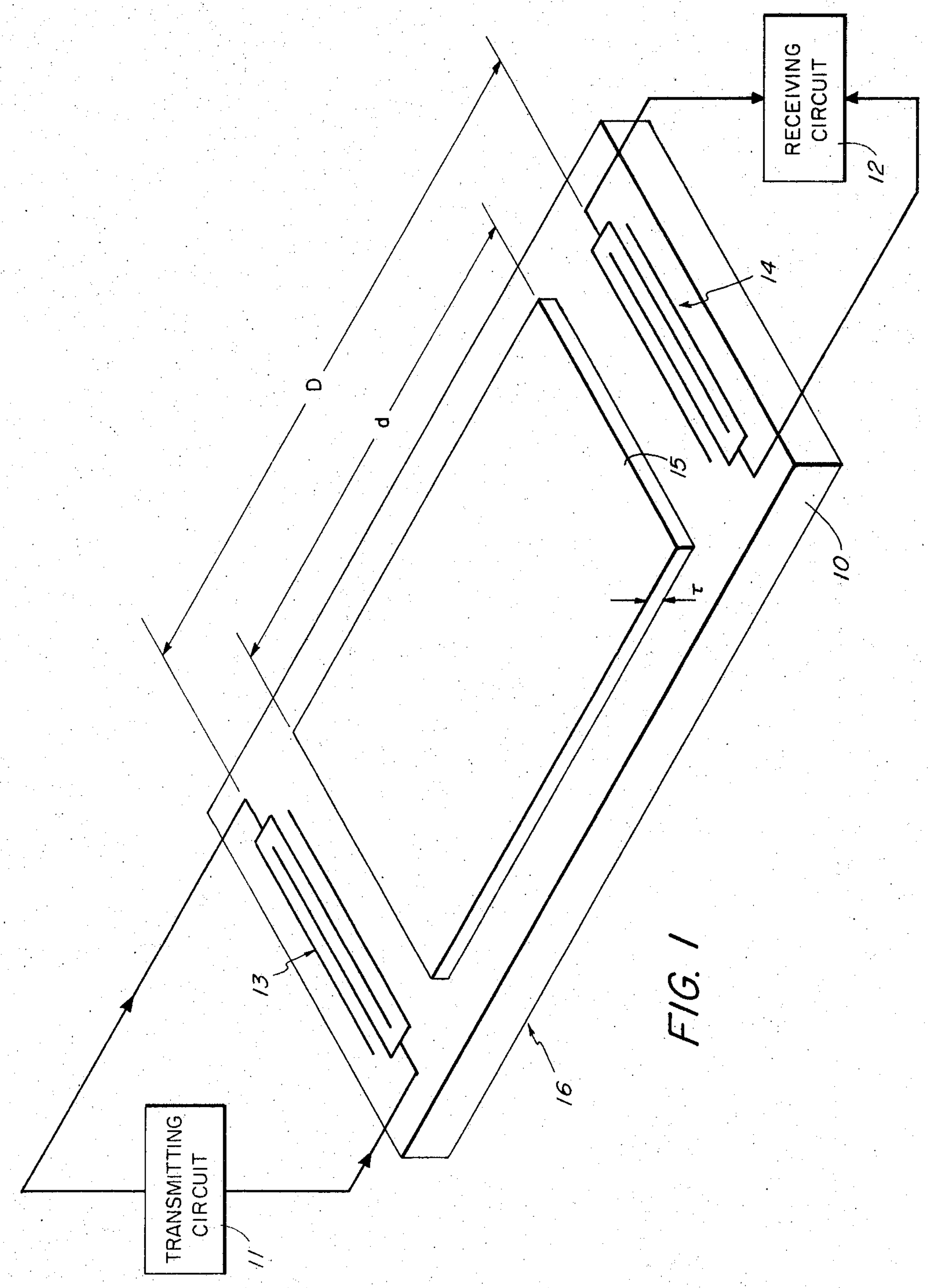
FIG. 1 is a perspective view of an acoustic surface wave delay line constructed in accordance with the present invention.

In FIG. 1 is shown an acoustic surface wave delay line shown generally at 16 constructed upon a piezoelectric substrate 10. This substrate may be a slab of piezoelectric material such as, for example, $LiNbO_3$, quartz, ZnO, or $Bi_{12}GeO_{20}$ or it may be a layer of such a piezoelectric material mounted upon an underlying non-piezoelectric substrate. The slab 10 is cut such that the direction of propagation of wavefronts is directed parallel to a preferred axis in the material. In a conventional delay line of this type, the transmitting circuit 11 would couple an impulse of electrical energy to the transmitting transducer 13 which converts electrical energy into an electromechanical or, as it is commonly termed, an acoustic wave and which launches the wave into the piezoelectric substrate 10 towards the receiving transducer 14. These transducers are preferably interleaved sets of metal strips or fingers. The spacing between fingers and the width of the fingers is determinative of the frequency response characteristics of the transducers. The spacing between fingers is one-half wavelength at the dominant frequency. The wave launched from the transmitting transducer 13 propagates towards the receiving transducer 14 by a well-known electromechanical phenomena peculiar to piezoelectric materials. The molecules in the crystal lattice of the substrate 10 move in quasielliptical paths thereby distorting the crystal lattice in such a way as to produce an electric field both above and under the surface of the piezoelectric substrate. When the wave reaches the receiving transducer 14, the energy is retransformed into electrical energy which is subsequently detected by the receiving circuit 12. For such a device, the total change in phase for a wave traveling a distance D from transmitting fingers 13 to receiving fingers 14 is given by:

$$\phi = 2\pi f D / V$$

where $\phi$ is the total phase change between transmitting and receiving transducers, $f$ is the frequency of the wave, D is the distance between transmitting and receiving fingers, and $v$ is the velocity of propagation in the piezoelectric material. For $LiNbO_3$, $v$ is approximately $3.5 \times 10^5$ cm/sec along the Z axis.

In order to alter the phase characteristics of the device, in accordance with the present invention, a layer 15 of an electrically conductive material such as aluminum or gold is deposited over part of the surface of the piezoelectric layer 10 between the transmitting transducer 13 and receiving transducer 14. The effect of the conducting layer 15 is to short circuit the electric field at the surface of the substrate 10 so as to eliminate the propagating electric fields in the region above the surface of the piezoelectric layer 10 and to thereby slow the acoustic wave propagation. The total phase difference between the transmitting and receiving fingers is altered since the wave is slowed as it runs under the conducting layer 15. The total phase change from edge to edge of the conducting layer 15 is given by:

$$\phi = 2\pi f d / V'$$

where $d$ is the length of the conducting layer 15 and $v'$ is the velocity of the wave as it travels underneath the layer 15. The total phase change caused by the insertion of conducting layer 15, if the velocity change is small compared to the total velocity, is given by:

$$\delta\phi = 2\pi f d / v \cdot \delta v / v$$

where $\delta\phi$ is the phase change caused by the insertion of the conducting layer 15 and $\delta v / v$ is the proportional change in velocity caused by the insertion of the layer 15. This equation, which is obtained by differentiating the previous equation, is valid for a small $\delta v / v$ and hence for $v'$ approximately equal to $v$. For $LiNbO_3$, it has been found that $\delta v / v$ is typically 0.022 for waves propagating along the Z axis of the crystal. For other piezoelectric materials, the ratio $\delta v / v$ is similarly a small number. For example, for Y cut, X propagating quartz it is 0.001 while for (111) cut, $(\bar{1}10)$ propagating $Bi_{12}GeO_{20}$ it is 0.008.

The thickness $\tau$ of the conducting layer 15 should be great enough such that the layer will conduct over all of its surface and yet not so great as to disturb the propagation velocity by force of its weight. A layer of aluminum between 100 A and 300 A in thickness will fulfill this purpose.

Rearranging the preceding equation to obtain the length $d$ for a desired change in phase:

$$d = \delta\phi / (\delta v / v) \cdot v / 2\pi f$$

For $\delta\phi = 2\pi$ (one cycle or 360°) with $v = 3.5 \times 10^5$ cm/sec, $f = 2$ MHz, and $\delta v / v = 0.022$, $d$ is calculated with the above equation to be 0.079 cm. The ratio between a wavelength in the piezoelectric material alone and the length of conducting layer needed for a change in phase of one wavelength is approximately 1:45. It may be immediately inferred that the length d of conducting layer 15 need be controlled only to one-forty-fifth the tolerance on the spacing between sets of fingers for the same overall device delay tolerance.

After the sets of fingers have been photolithographically deposited on the surface 10 of the piezoelectric material, the phase change between the sets of fingers may be measured and an appropriate length of conductive coating may be deposited on the surface of the substrate to correct for the difference between desired and measured phase or delay characteristics. Such a technique is particularly useful where it is desired to make many delay lines, each with a slightly different total delay time. It is also extremely useful in producing delay lines with precisely controlled delay times such as those used in delay line memories. Furthermore, such techniques may be adapted, as will be discussed in reference with FIG. 2, to selectively correct the phase response of a piezoelectric acoustic wave filter device over a broad band of frequencies.

Figure 2:
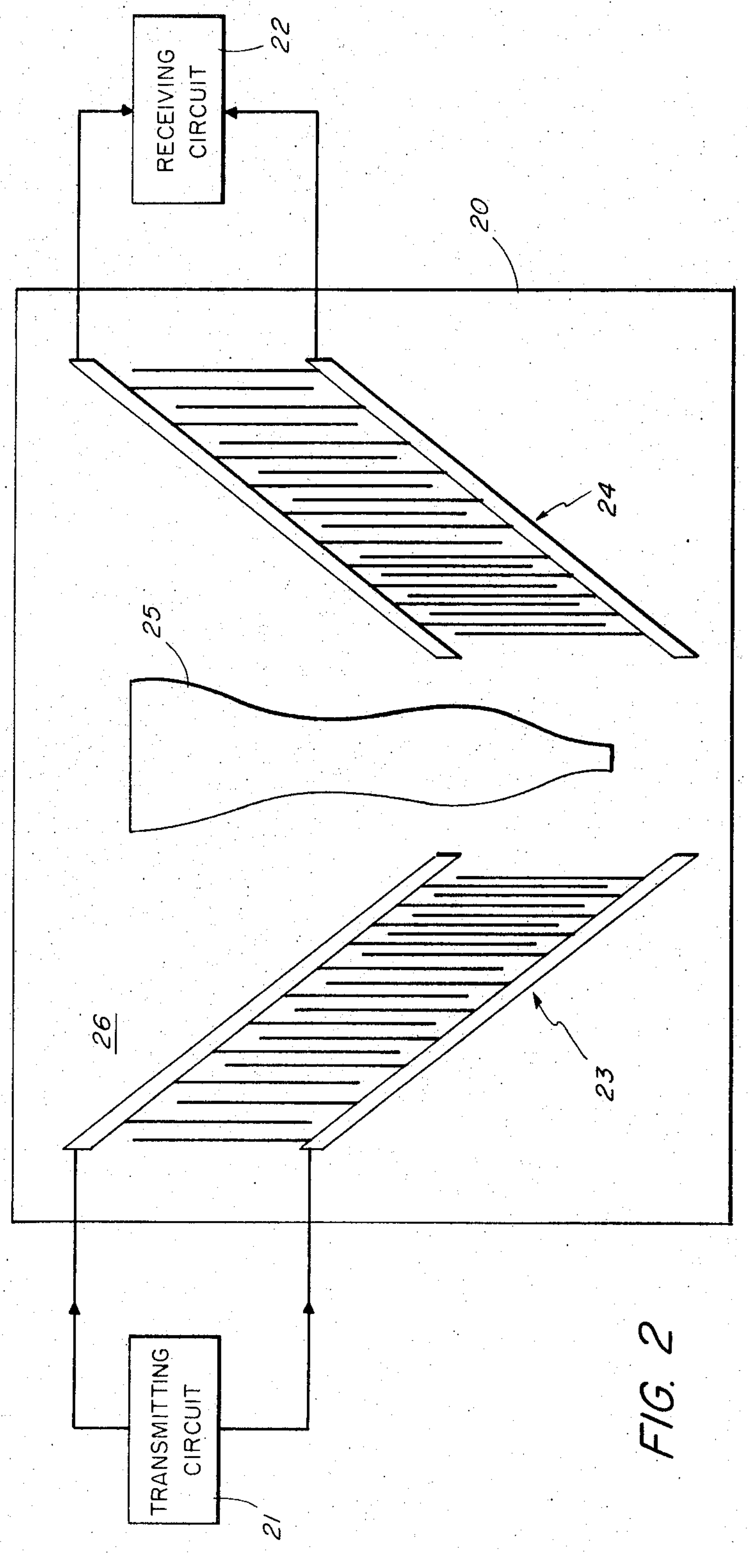
FIG. 2 is a tilted delay line filter constructed in accordance with the present invention.

In FIG. 2 is shown a broadband tilted acoustic wave delay line constructed in accordance with the present invention. The basic structure of such a tilted delay line is disclosed in copending application Ser. No. 185,601. This delay line, shown generally at 26, has receiving fingers 23 and transmitting fingers 24 similar to those shown in FIG. 1 but each preferably having a larger number of fingers for the transducers. The spacing between fingers is varied along the length of the transducer so that the higher frequency shorter wavelength signals are transmitted and received with the lower portions of the transducer where the fingers are closer together while the lower frequency longer wavelength signals are transmitted and received at the upper portions of the device where the fingers are further apart.

Figure 3:
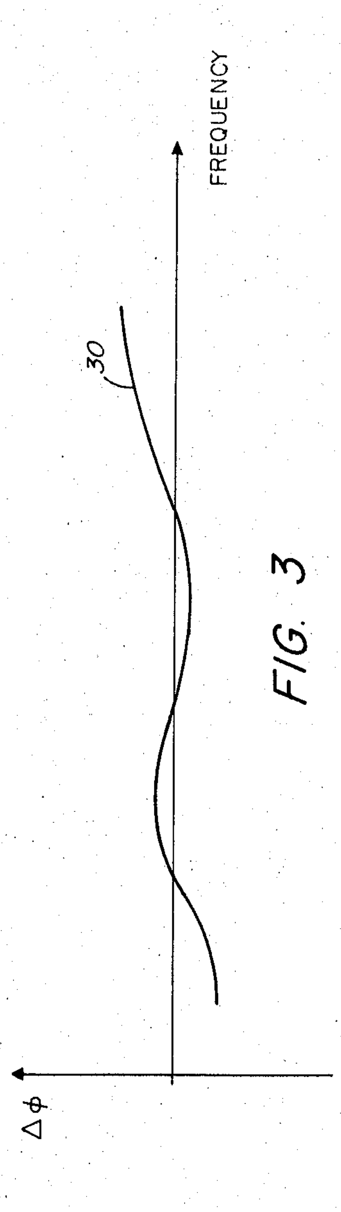
FIG. 3 is a graph showing an example of possible phase errors in a delay line such as the one shown in FIG. 2 before phase corrections are applied.

The deviation of the phase characteristics from the desired response of an example of such a device without phase correction are graphed in FIG. 3 wherein the measured phase response deviation is plotted versus frequency. Due to manufacturing and photolithographic tolerances, the phase deviation may, for example, be that shown by curve 30. $\Delta\phi$ represents the error between the desired phase response and the measured phase response. In order to correct for such errors so that such a delay line device will be useful for wideband applications, such as may be used in a chirped radar system where the phase delay is proportional to the square of the frequency, the phase characteristics are first measured as a function of frequency. Then, a conductive strip is fashioned in such a shape as will cancel the errors caused by the manufacturing defects when the layer is on the surface of the device. The shape of the strip will depend on the function of $\Delta\phi$ versus frequency. Thus, when the conductive strip 25 in FIG. 2 is inserted between transmitting transducer 23 and receiving transducer 24, the phase deviation from desired response between the transmitting circuit 21 and receiving circuit 22 is eliminated. Of course, the same techniques may be applied if other phase characteristics are desired other than the quadratic phase characteristic. Trimming of the strip may be accomplished with laser techniques as is presently used to trim quartz crystals or standard etching techniques.

Figure 4:
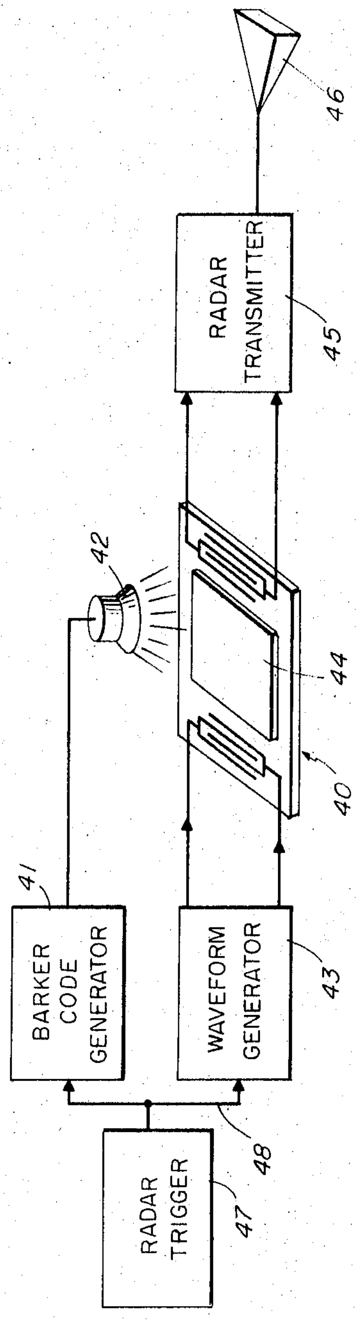
FIG. 4 is a perspective view of a delay line constructed in accordance with the present invention embodied in a block diagram of a pulsed phase coded radar system.

FIG. 4 shows an embodiment of the device constructed in accordance with the present invention in which the conductive layer, here 44, is replaced by a thin layer of the photoconductive material, CdS for example, 500 A in thickness. When no light is shone on the CdS layer 44, the layer is an insulator and no phase change is effected across the layer. However, when light of sufficient intensity is shone upon the layer 44, it becomes a conductor thereby changing the phase response of the device the same as when aluminum or other conductor is used. Thus, with a layer of CdS on the surface, the phase characteristics can be varied between that when no conductor is present and that when such a conductor is present. By turning the light applied to the CdS layer OFF and ON in response to a predetermined sequence, the phase characteristics of a signal propagated along the device will be varied according to that sequence.

Such a device may be used in a phase coded pulsed radar transmitter circuit such as a Barker coded circuit. In the circuit diagram of FIG. 4, the radar trigger 47 produces a pulse on lines 48 whenever a radar pulse burst is to be transmitted. The pulse on line 48 initiates a continuous waveform from waveform generator 43 which is coupled to the transmitting transducer 49 of the switchable delay line 40. The pulse on lines 48 also initiates the Barker code generator 41 which produces one of a number of possible Barker code binary sequences, for example, the 13-bit sequence 1-1-1-1-1-0-0-1-1-0-1-0-1. The light source 42 is turned OFF for binary 0 and ON for binary 1 so that the phase of the signal as measured at the receiving transducer 50 is in a first phase state when the light source 42 is OFF and in a second phase state when the light source 42 is ON in accordance with the preselected Barker code. The radar transmitter 45 amplifies the waveform from receiving transducer 50 and couples it for transmission to radar antenna 46.

Figure 5:
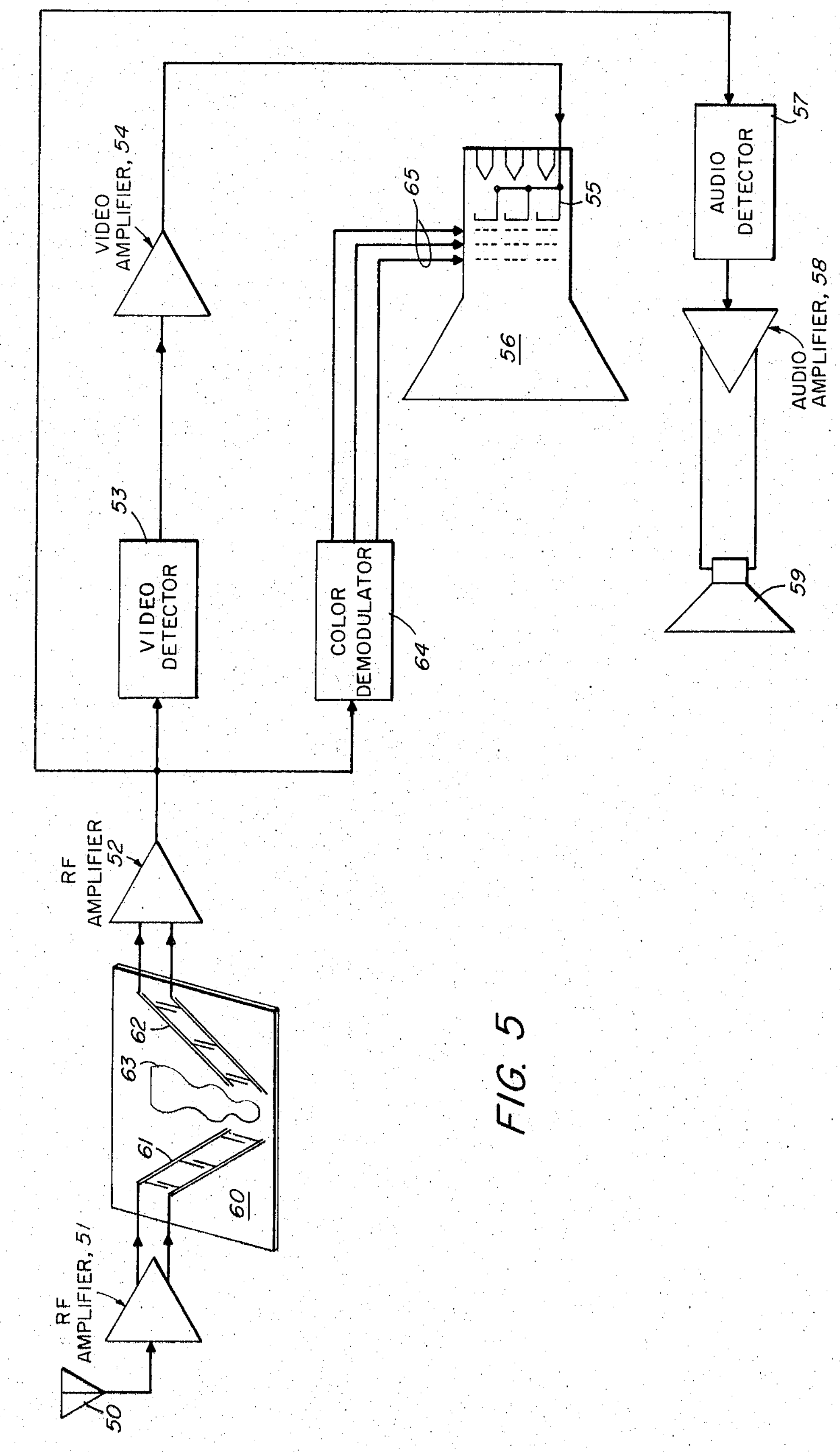
FIG. 5 is a perspective view of a delay line constructed in accordance with the present invention embodied in a color television receiver.

FIG. 5 is a block diagram of part of the signal receiving, tuning, and amplification circuits of a color television receiver which uses a device built in accordance with the present invention such as the device shown in FIG. 2. The circuit in FIG. 5 is a TRF (Tuned Radio Frequency) receiver circuit although the present invention may be used in the more conventional superheterodyne type of receiver circuit as well. The receiving antenna 50 intercepts the transmitted television signal and couples it to a first RF amplifier 51. RF amplifier 51 is a broadband amplifier with sufficient bandwidth for the entire range of television frequencies. An acoustic wave band-pass filter 60 constructed in accordance with the present invention is then inserted between the output of first RF amplifier 51 and second RF amplifier 52. The number of fingers and the spacing of the fingers in the receiving 61 and transmitting 62 transducers are chosen by well-known techniques for the desired band-pass characteristics for the television channel being received. The phase control layer 63 is shaped so as to provide linear phase characteristics over the channel bandwidth as linear phase characteristics are desirable for proper color signal reception and reproduction. A separate filter such as filter 60 may be provided for each television channel along with a channel switch to connect the proper filter for the desired channel. Second RF amplifier 52, also a broadband amplifier, boosts the output from receiving transducer 62 which consists only of the signal for the desired channel as all others have been substantially rejected by filter 60. Video detector 53 demodulates the video portion of the signal which is then amplified by video amplifier 54. Video detector 53 is capable of demodulating carrier signals over the entire range of television channels. After amplification by video amplifier 54, the video signal is coupled on line 66 to the three interconnected cathodes 55 of a standard shadow mask color cathode ray tube 56. The output of second RF amplifier 52 is also coupled to color demodulator 64 which demodulates the three red, blue and green primary color signals and couples each of the demodulated color signals to the appropriate electron gun grid on the three lines 65. Finally, the output of second RF amplifier 52 is connected to the sound circuit consisting of audio detector 57, audio amplifier 58, and loudspeaker 59.

Other ways in which the present invention may be employed in a color television receiver include use as an intermediate stage band-pass filter in a superheterodyne receiver. In such a case, the improved phase response of a device constructed according to the teachings of the present invention may be used to advantage in improving the color signal characteristics of the receiver in which it is used. The same type of device may also be used in an intermediate stage of a stereophonic FM receiver where it is important to maintain linear phase characteristics for proper reception of the stereophonic signal. Furthermore, the device may be used to advantage in radar receivers used in the reception of phase or frequency modulated radar signals or receivers in which the doppler shift of a signal is to be measured.

Although preferred embodiments of the invention have been described, numerous modifications and alterations would be apparent to one skilled in the art without departing from the spirit and scope of the present invention. For example, a multi-tap delay line may be constructed taking advantages of the teachings of the present invention. In such a delay line, the precise delay time between taps may be controlled using a metal conductive layer as described above specifically fashioned for the precise delay time desired. Furthermore, a plurality of photoconductive strips can be inserted between the receiving and transmitting transducers each of which may be separately made to conduct or not to conduct such that the overall phase characteristics may be altered in steps according to which strips are activated. Also, more than one transmitting transducer and receiving transducer may be used wherein the phase characteristics among all of these may be set with the use of conductive strips. In some of the conductive strip techniques, a conductor with relatively high resistivity such as nichrome may be used to add attenuation to the propagating waves so as to reduce problems caused by unwanted wave reflections. Phase switching may also be accomplished by mechanically moving the conductive strip.

What is claimed is:

1. In combination:

means for propagating a surface wave in a piezoelectric material; and means for varying the velocity of said surface wave over at least a portion of said piezoelectric material, the velocity of said surface wave over said portion of said piezoelectric material being substantially independent of the mass of said velocity varying means and said velocity varying means operating independently of mechanical properties of said piezoelectric material said velocity varying means having a thickness in the range of 100 A to 300 A.

2. The combination according to claim 1 wherein said propagating means comprises:

a slice of piezoelectric material; and means for inducing said surface wave in said slice of piezoelectric material.

3. The combination according to claim 2 wherein said inducing means comprises a transducer for converting an electrical signal into a mechanical signal in said piezoelectric material.

4. The combination according to claim 2 wherein said piezoelectric material is lithium niobate.

5. The combination according to claim 1 wherein said velocity varying means comprises gold.

6. The combination according to claim 1 wherein said velocity varying means comprises aluminum.

7. The combination according to claim 1 wherein said velocity varying means comprises a photoconductive material.

8. The combination according to claim 1 further comprising transducer means for converting said surface wave to an electrical signal.

9. The combination according to claim 8 further comprising utilization means for varying the phase of signals in a radar system.

10. The combination according to claim 8 further comprising utilization means in a receiver circuit.

11. In combination:

a slice of piezoelectric material having at least one substantially smooth surface;

first transducer means for converting an electrical signal into a surface wave on said substantially smooth surface of said slice of piezoelectric material, said first transducer means being adjacent to said substantially smooth surface;

second transducer means for producing an electrical signal in response to said surface wave; and means for varying the velocity of said surface wave comprising a sheet of conductive material adjacent to said substantially smooth surface located between said first and second transducer means, the velocity of said surface wave on said substantially smooth surface being substantially independent of the mass of said sheet and said velocity varying means operating independently of mechanical properties of said piezoelectric material, said velocity varying means having a thickness in the range of 100 A to 300 A.

12. The combination according to claim 11 wherein said first and second transducer means each comprise interleaved pairs of conductive strips.

13. The combination according to claim 11 wherein said sheet of conductive material comprises a layer of aluminum.

14. The combination according to claim 11 wherein said sheet of conductive material comprises a layer of gold.

15. A surface wave device having input and output terminals comprising in combination:

a slice of piezoelectric material;

means for inducing surface waves in said piezoelectric material, surface waves of different frequencies propagating over different portions of said slice of piezoelectric material;

means for varying the velocity of said surface waves over at least a portion of said slice of piezoelectric material, the proportion by which said velocity is varied being dependent upon said frequencies.

16. The combination of claim 15 wherein said velocity varying means comprises a sheet of conductive material.

17. The combination of claim 16 wherein surface dimensions of said sheet of conductive material are preselected in accordance with preferred frequency characteristics of said device.

18. The combination of claim 17 wherein said sheet of conductive material is aluminum, said sheet of conductive material having a thickness between 100 A and 300 A.

* * * * *

UNITED STATES PATENT OFFICE

CERTIFICATE OF CORRECTION

Patent No. 3,845,420 Dated October 29, 1974

Inventor(s) Melvin G. Holland, Manfred B. Schulz and Harrison H. Barrett

It is certified that error appears in the above-identified patent and that said Letters Patent are hereby corrected as shown below:

Column 3, line 27, the equation should read as follows:

$$\delta\phi = -\frac{2\pi fd}{v} \cdot \frac{\delta v}{v}$$

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*